United States Patent [19]

Hinson

[11] Patent Number: 4,755,879
[45] Date of Patent: Jul. 5, 1988

[54] VIDEO PROCESSING SYSTEMS

[75] Inventor: Neil R. Hinson, Newbury, Great Britain

[73] Assignee: Quantel Limited, Kenly, United Kingdom

[21] Appl. No.: 62,767

[22] Filed: Jun. 15, 1987

[30] Foreign Application Priority Data

Jun. 21, 1986 [GB] United Kingdom ............... 8615214

[51] Int. Cl.⁴ ............................................. H04N 5/213
[52] U.S. Cl. ...................................... 358/167; 358/166
[58] Field of Search ................. 358/167, 166, 36, 155

[56] References Cited

U.S. PATENT DOCUMENTS

| 4,191,968 | 3/1980 | Kirk, Jr. ............................... | 358/167 X |
| 4,212,072 | 7/1980 | Huelsman et al. ................. | 358/167 X |
| 4,680,632 | 7/1987 | Willis et al. .......................... | 358/166 |

FOREIGN PATENT DOCUMENTS 1520311 8/1978 United Kingdom .
2087193 5/1982 United Kingdom .

Primary Examiner—James J. Groody
Assistant Examiner—E. Anne Faris
Attorney, Agent, or Firm—Cooper & Dunham

[57] ABSTRACT

A video processing system is disclosed having a store (1) into which video signals, in the form of a sequence of pixels, are written into and read out of in response to common fixed clocking pulses, although the input video signal is synchronized independently of the output video signal. The phase of the pixels at the input to the store, and also the phase of the line and field synchronizing pulses, is adjusted to correct sub pixel phase error between input and output so that the common pixel clocking pulses can be used thereby substantially reducing cross talk between the input and output signals.

2 Claims, 5 Drawing Sheets

PRIOR ART FIG.1

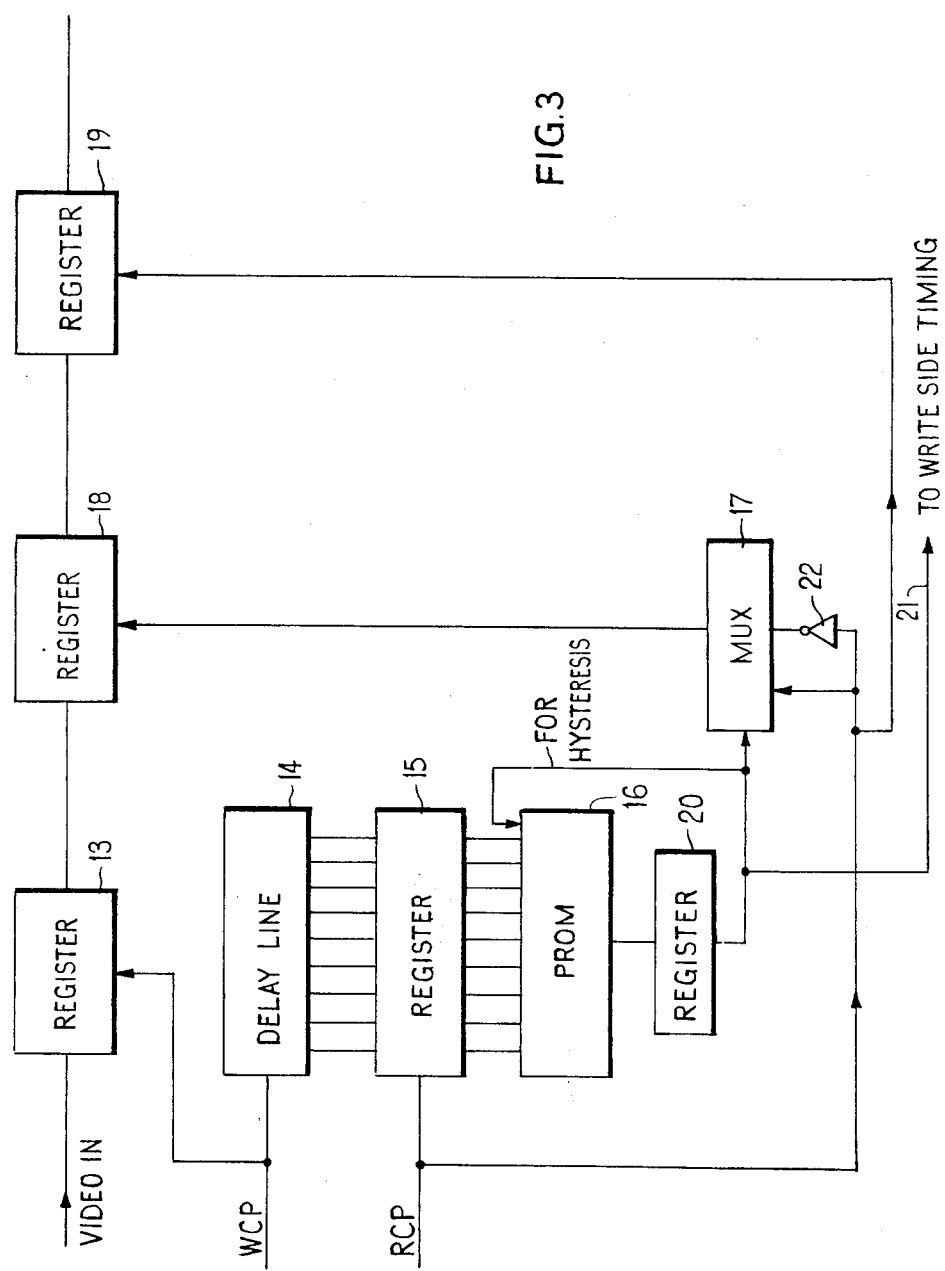

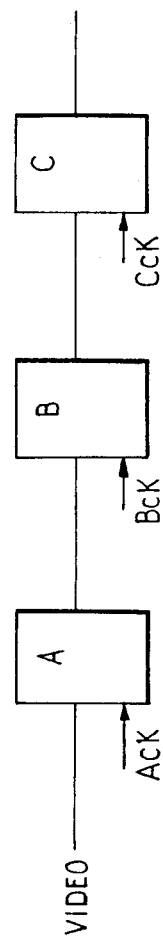
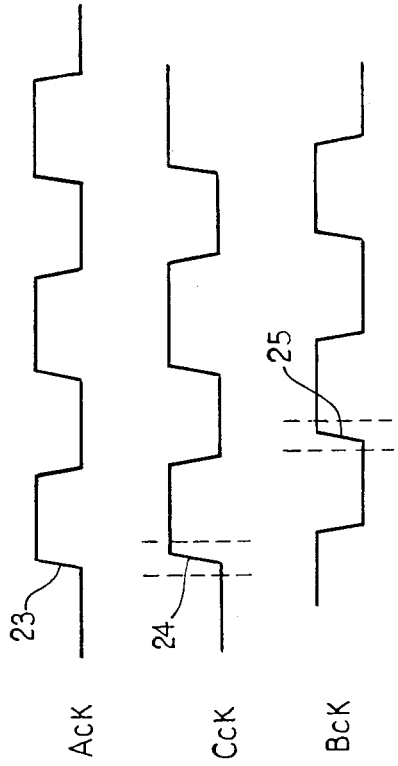
FIG.4a
FIG.4b

VIDEO PROCESSING SYSTEMS

This invention relates to improvements in video processing systems.

In a studio, or other situation, video processing systems are required to operate on video signals from a variety of sources to produce processed images. Because of the nature of these sources, signals from different sources will arrive at the input of the processing system with different horizontal phases but the output of the processor is required to be at a predetermined horizontal phase which may not be the same as one or more of the input horizontal phases. In prior art systems this difficulty has been overcome by providing the input and output parts of the processing system with separate timing circuits and achieving the timing change over at some part in the processor but usually at a framestore. A prior art system of this kind is shown schematically in FIG. 1, and an example of the kind of processor in which it is used is in Quantel's Encore system. In this case the framestore which is part of the processing system is implemented as two field stores, 2 and 3. The processing circuit is not otherwise shown but may be of any kind. Signals from a source, at a horizontal phase determined by that source, are input to analogue to digital converter 1 and converted to digital signals. The digital signals are then written into field store 2 and the timing for writing these signals into the store and for any filtering or processing that occurs on or before the write operation is provided by timing circuit 4. This timing is at the phase of the input signals.

At the same time as input signals are being written into field store 2 with input timing, signals are read from field store 3 under the control of timing circuit 5 which provides timing signals at the output phase. After one field has been written into field store 2 and read from field store 3 the operation of the field stores has to be switched so that signals are now written into field store 3 under control of timing circuit 4 and read from field store 2 under the control of timing circuit 5. It will be appreciated that any processing undertaken on the signals output from the store will also be under the control of timing circuit 5. Before being output from the circuit the digital signals are converted in digital to analogue converter 6.

Usually the two timing circuits in the prior art systems are such as to give approximately synchronous clock signals at pixel rate but are asynchronous with regard to phase. The difference in phase between the input and output signals may then be a whole number of pixel intervals plus or minus a faction of such interval. This fractional difference in phase can result in cross talk whenever the two signals are in close proximity as in, say, the framestore or on the highways. The data errors which result from the cross talk produce 'spots' on the final image which can be very noticeable as so called 'zits'.

Similar errors also occur with regard to phases differences in systems with entirely asynchronous inputs and output, such as standard converters and synchronisers.

The object of the present invention is to provide a video processing system wherein the problem of cross talk between differently phased signals is substantially eliminated by making almost all of the processing synchronous at the pixel clock level.

According to the invention there is provided a video processing system comprising:

input means for video signals comprising a sequence of pixels representing an image, means providing input clocking pulses including input line clocking pulses, processing means including a store having means for writing and reading said video signals therein to process said video signals, output means for said video signals read from said store, means providing output clocking pulses including output line clocking pulses, said means for writing and reading said video signals in said store being responsive to said input and output line clocking pulses respectively, means providing pixel timing signals synchronised with the pixels of said video signal at one of said input means and output means and with the respective clocking pulses, means for adjusting the sub pixel phase of the pixels of said video signals at the other of said input and output means and of the respective clocking pulses, to substantially correct sub-pixel phase errors between the pixel of said video signals at said input and output means and between said input and output clocking pulses before writing and/or reading said video signals in said store.

Preferably said means for adjusting the horizontal phase includes means for re-synchronising said video signals with said common clock and means for re-synchronising the line and field clock pulses with said common clock.

One embodiment of the invention will now be described with reference to the following drawings.

FIG. 1 as already stated shows a schematic representation of a prior art system.

FIG. 3 shows a schematic representation of the video re-synchronising circuit.

FIGS. 4a and 4b illustrates the operation of the re-synchronising circuit.

Figure 1:
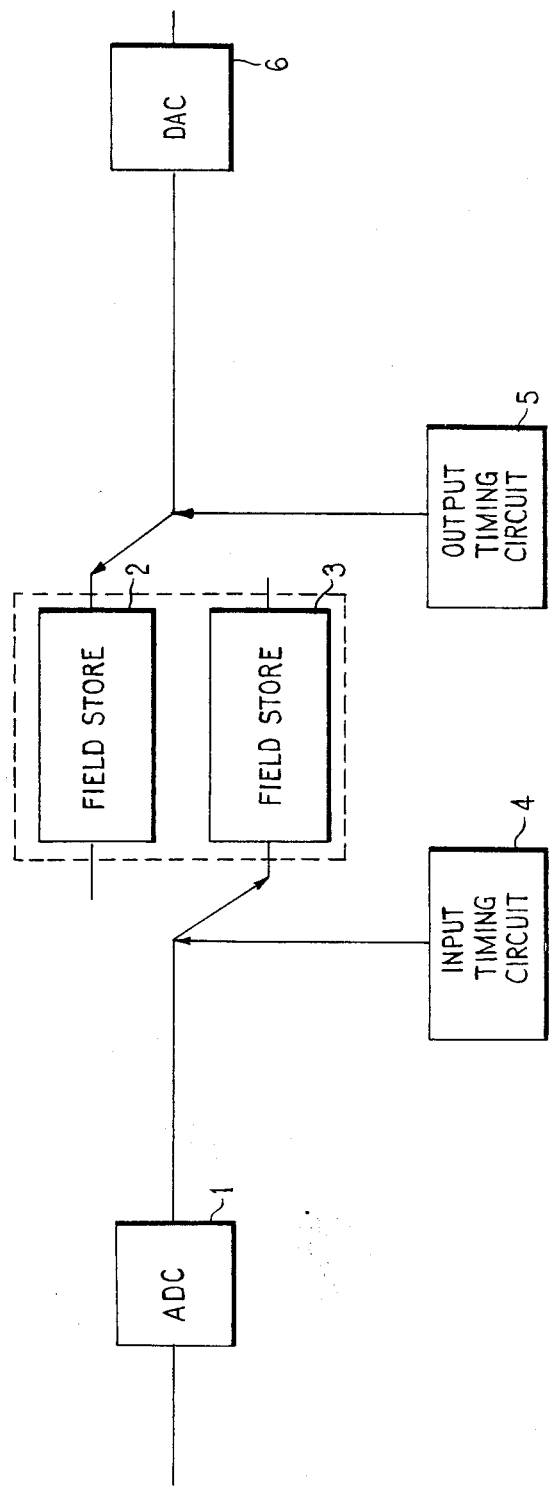
Figure 2:
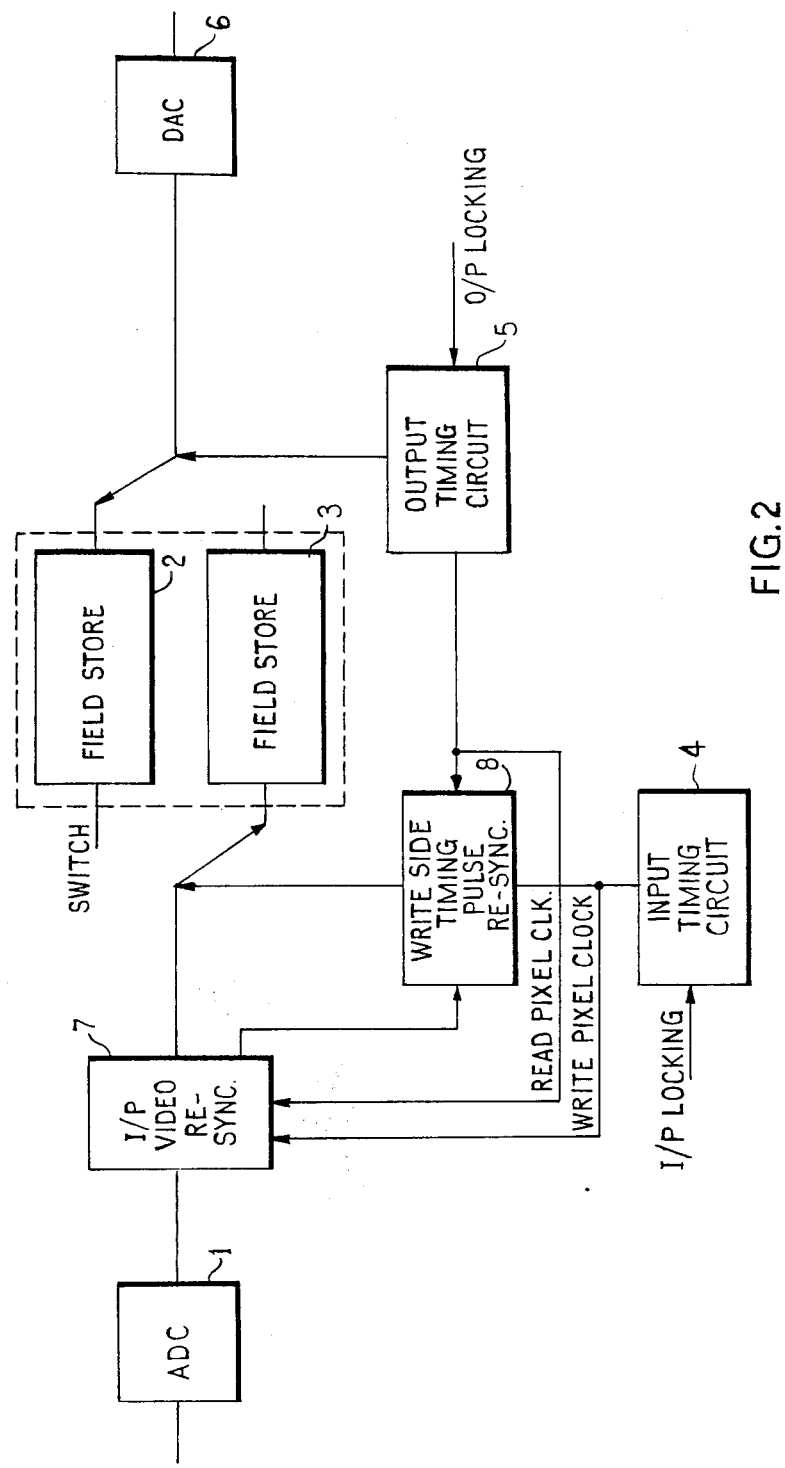
FIG. 2 shows a schematic representation of the said embodiment of the invention.

In the embodiment shown in FIG. 2, which shares some components with the prior art system of FIG. 1, input video signals in analogue form are received by the system with a horizontal phase determined by the source of the signals, and are input to an analogue-to-digital converter 1. A input locking signal is also received and input to the input timing circuit 4. This locking signal comprises the sync. signal waveform associated with the input video signal and includes line and field pulses. In the analogue-to-digital converter 1, the video signal is sampled at times determined by write pixel clock pulses provided by the circuit 4 and timed relative to the sync. signal waveform, the samples being converted to respective digital signals in known manner. After conversion in ADC 1, the digital video signals are applied to a processing circuit, represented as a frame store comprising two field stores 2 and 3, via a video re-synchronising circuit 7 (shown in greater detail in FIG. 3). The processing circuit 8 (which may include more than one framestore) has circuits for writing and reading the digital video signal at selected addresses of the framestore and for manipulating the video signals in a variety of other ways to produce effects such as filtering, noise reduction, shape manipulation and so on. A timing circuit 8 provides pixel, line and field clock pulses for clocking the digital video signals in the field stores 3 and also for such video processing as occurs on the write side of these stores. The clock pulses provided by the circuit 8 are derived from the input timing circuit 4 but are resynchronised in circuit 8 in the same way as the video signals in circuit 7. The output timing circuit 5 receives an output locking signal which is derived independently of the input locking circuit and it provides line and field pulses and pixel clocking pulses for clocking the video signals appearing at the output side of the processing circuit 3. It also provides pixel clocking pulses to the re-synchronising circuits 7 and 8 to control the re-synchronisation which occurs therein.

Referring to FIG. 3, the video re-synchronising circuit 7 comprises three video signal pixel registers 13, 18 and 19, a phase comparator 14–16, a multiplexer 17, a control signal register 20 and a inverter 22. Write side pixel clock pulses WCP from the input timing circuit 4 are applied to the first register 13 and also to a tapped delay line 14 which has a delay of about 10 ns. per tap. As a pixel clock pulse WCP travels down the delay line, it appears successively at the taps. The taps are connected to a register 15 to provide an input thereto, and read side pixel clock pulses RCP from the circuit 5 are also applied to the register to cause the register to temporarily store a record of the pulse position in the delay line 14 at the instant of the respective read side pixel clock pulse. Thus at any time the register provides a snapshot of the sub-pixel phase difference between the write and read side pixel clock pulses. A PROM 16 responds to the snapshot to produce a control signal which has one value if the said phase difference lies in one range of possible values and a different value if it lies in the remainder of said range. The control signal from the PROM 16 controls the operation of a multiplexer 17 to cause it to apply one or other of two inputs as clocking signal to the second register 18. One of these inputs comprises the read side pixel clock pulses RCP as provided by the circuit 5, and the other as inverse of these pulses, produced by inverting circuit 22. The inverter 22 and multiplexor 17 inevitably produce a delay of the inverted RCP pulses, (see FIG. 4) compared with the RCP pulses from the circuit 5. Advantage is taken of this delay in carrying out re-synchronisation.

The control signals from the register 20 are applied by path 21 also to the timing pulse re-synchronising circuit 8 at the write side, as are the read side pixel clock pulses from the output timing circuit 5. The output of the register 20 is also passed back to PROM 16 where it provides hysteresis. It prevents the register 20 from switching unnecessarily between its two outputs when the register 15 indicates a phase difference near the value at which the PROM is programmed to switch the control signal from register 20. It will be understood that there is a range of phase differences adjacent this switching value at which the control signal may have either value without causing incorrect operation.

To explain the operation reference will be made to FIG. 4, in which A, B and C in FIG. 4a corresponds to the register 13, 18 and 19 of FIG. 3, and the pixel clock pulses applied to them are denoted by reference AcK, BcK and CcK in FIG. 4b. Pulse edges such as 23, 24 and 25 will cause the video signal in the respective registers A, C and B to be transferred to the next register or the processing circuit 3 as the case may be. As the registers 13, 18 and 19 are respectively clocked by pulses WCP, the pulses from MUX 17, and the pulses RCP, successive pixels are passed from register to register, emerging from register 19 in synchronism with the pulses RCP although they were initially synchronised with the pulses WCP.

Considering first the register C there will be a period including each edge 24 of pulses Cck when the operation of the register is uncertain. This period is indicated by the dotted lines on either side of edge 24, and error could arise in re-synchronising the video signal if transfer to register C is attempted during the period of uncertainty. However the use of the intermediate register B and the operation of FIG. 3 avoids such errors, even although there is a similar period of uncertainty around the clocking edges such as 25, of the pulse BcK. FIG. 3 is so arranged that if the phase difference between the write side pixel clock pulses WCP and the read side pixel clock pulses RCP is such that edges 23 fall within or close to the periods of uncertainty, the control signal from the register 20 causes the multiplexer 17 to deliver the inverted pulses from 22 to the register B but if the edges 23 and 24 are clear of each other, the control signal causes the multiplexer to deliver the non-inverted read side pixel pulses to the register B. In FIG. 4b the first of these situations is depicted; edge 23 will transfer the respective video signal pixel from A to B, with certainty, edge 25 will then transfer the pixel to register C, and the next-to-occur edge 24 will transfer the pixel to the processor 3. It will be appreciated that the pixel will now be synchronised with the read side pixel clock pulses, as required. In the case of the alternative situation, the pulses BcK will revert to the non-inverted case, but will be delayed in the multiplexing circuit 17 sufficiently to ensure that the clocking edges of the pulses BcK do not occur during a period of uncertainty of the register C. Similarly the clocking edges of AcK will not occur during the period of uncertainty of the register B. Synchronisation of the pixels fed to the processor 3 with the read side pixel clock pulses is again assured.

Figure 5:
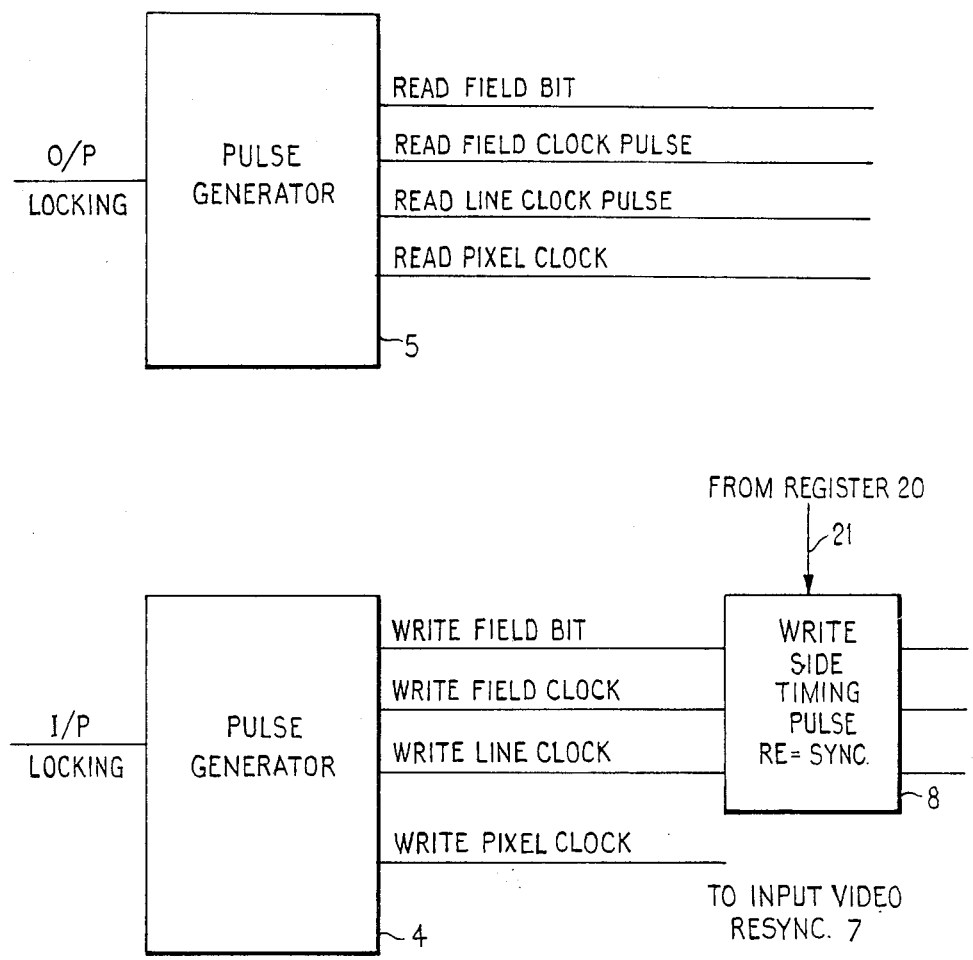
FIG. 5 illustrates timing circuits for producing input and output timing signals.

In prior art systems there would be separate circuits for providing clock pulses, including the pixel clock pulses for the write and read side of the processor and in this embodiment of the invention there are still separate circuits 4 and 5 for providing the write and read side line and field pulses but the pulses on both sides are synchronised by pixel clock pulses from the output timing circuit 4. The video signal is similarly synchronised. Although the two sets of line and field clock pulses are synchronised with the same pixel clock pulses, they are not necessarily in phase with each other and they may be out of phase by multiples of pixel spacing. In this example, the processing is carried out at the pixel phase desired for the output. Therefore, in the embodiment shown in FIG. 2, the sub-pixel phase of the video signals and the synchronising signals needs to be adjusted at input side. The operation of the circuits 4, 5 and 8 is depicted graphically in FIG. 5.

In some cases the input and output roles may be interchanged, and the sub-pixel adjustment carried out at the output side.

It is to be understood that this invention may be applied to systems with entirely asynchronous inputs and outputs such as standard converters, synchronising circuits etc.

I claim:
1. Video signal processing system comprising:
    input means for video signals comprising a sequence of pixels representing an image, means providing input clocking pulses including input line clocking pulses, processing means including a store having means for writing and reading said video signals therein to process said video signals, output means for said video signals read from said store, means providing output clocking pulses including output line clocking pulses, said means for writing and reading said video signals in said store being responsive to said input and output line clocking pulses respectively, means providing pixel timing signals synchronized with the pixels of said video signal at one of said input means and output means and with the respective line clocking pulses, means for adjusting a sub pixel phase of the pixels of said video signal at the other of said input and output means and of the respective clocking pulses, to substantially correct sub-pixel phase errors between the pixel of said video signals at said input and output means and between said input and output line clocking pulses before writing and/or reading said video signals in said store.

2. Video signal processing system according to claim 1 wherein said means providing synchronized pixel timing signals is arranged to provide said pixel timing signals synchronized with the pixels of said video signals at said output means, and said means for adjusting the sub-pixel phase is arranged to effect said adjustment to the sub-pixel phase of the pixels of said video signal at said input means, and of the respective clocking pulse.

* * * * *